(12) United States Patent
Li

(10) Patent No.: US 8,413,943 B1
(45) Date of Patent: Apr. 9, 2013

(54) SECURING DEVICE FOR TABLE DEVICE

(75) Inventor: Chi-Yuan Li, New Taipei (TW)

(73) Assignee: ABA UFO International Corp., New Taipei (TW)

( * ) Notice: Subject to any disclaimer, the term of this patent is extended or adjusted under 35 U.S.C. 154(b) by 11 days.

(21) Appl. No.: 13/277,722

(22) Filed: Oct. 20, 2011

(51) Int. Cl.
*A47G 1/24* (2006.01)

(52) U.S. Cl. .... 248/454; 248/551; 248/451; 248/292.12

(58) Field of Classification Search ............... 248/454, 248/551, 441.1, 447, 447.1, 448, 451, 455, 248/456, 457, 452, 453, 460, 462, 122.1, 248/292.12
See application file for complete search history.

(56) References Cited

U.S. PATENT DOCUMENTS

| 1,071,428 | A | * | 8/1913 | Jones | 248/448 |
|---|---|---|---|---|---|
| 2,164,299 | A | * | 6/1939 | Mandell et al. | 40/741 |
| 3,076,285 | A | * | 2/1963 | Sparkman | 248/448 |
| 5,797,578 | A | * | 8/1998 | Graffeo et al. | 248/453 |
| 5,903,645 | A | * | 5/1999 | Tsay | 379/455 |
| 6,711,921 | B1 | * | 3/2004 | Yang | 70/58 |
| 7,922,137 | B2 | * | 4/2011 | Derry et al. | 248/274.1 |
| 7,967,269 | B2 | * | 6/2011 | Liu | 248/287.1 |
| 8,066,241 | B2 | * | 11/2011 | Yu et al. | 248/286.1 |
| 8,235,334 | B1 | * | 8/2012 | Kobal | 248/122.1 |
| 2005/0236536 | A1 | * | 10/2005 | Fan | 248/176.3 |
| 2007/0040089 | A1 | * | 2/2007 | Shiff | 248/448 |
| 2012/0217371 | A1 | * | 8/2012 | Abdollahzadeh et al. | 248/551 |

* cited by examiner

*Primary Examiner* — Anita M King
(74) *Attorney, Agent, or Firm* — Hershkovitz & Associates, LLC; Abraham Hershkovitz

(57) ABSTRACT

A securing device for a tablet device has a main seat, two positioning rods, two first resilient elements, two driving sliders, two sets of holding legs and a lock. The holding legs hold the tablet device. When the lock is locked, the lock is unable to detach from the main seat, and the positioning rods, the driving sliders and the holding legs are unable to move. Consequently, the securing device is unable to detach from the tablet device. Thus, as a cable of the lock is looped around a post, the tablet device is secured at a specific position and is not stolen easily.

11 Claims, 8 Drawing Sheets

SECURING DEVICE FOR TABLE DEVICE

BACKGROUND OF THE INVENTION

1. Field of the Invention

The present invention relates to a securing device, especially to a securing device for a tablet device.

2. Description of the Prior Art(s)

A tablet device generally refers to a tablet-sized computer and is a newly emerging electronic device following the netbook. The tablet device is integrated with a flat touch screen and is primarily operated by touching the screen. Mostly, the tablet device is used as an electronic book reader or for Internet surfing, and is the most popular electronic product nowadays.

The tablet device is a kind of personal computer that allows a user to carry around and to use at any occasion, such as a coffee shop, library and the like. However, when the user has to leave the tablet device for a while, the tablet device is stolen easily.

To overcome the shortcomings, the present invention provides a securing device for a tablet device to mitigate or obviate the aforementioned problems.

SUMMARY OF THE INVENTION

The main objective of the present invention is to provide a securing device for a tablet device. The securing device has a main seat, two positioning rods, two first resilient elements, two driving sliders, two sets of holding legs and a lock.

The main seat has a pivot. The pivot has a threaded hole and a mounting channel. The threaded hole is axially formed in the distal end of the pivot. The mounting channel of the pivot is radially formed through the pivot, communicates with the threaded hole and has two open ends.

The positioning rods are respectively mounted through the open ends of the mounting channel of the pivot. Each positioning rod has an inner end and an outer end. The inner end of the positioning rod protrudes into the mounting channel of the pivot. The outer end of the positioning rod is toothed.

The first resilient elements are respectively mounted between the pivot and one of the positioning rods and between the pivot and the other one of the positioning rods, and push the positioning rods outwards.

The driving sliders are mounted on the main seat and are transversely slidable. Each driving slider has a rack. The rack transversely protrudes from the driving slider and has a toothed driving surface corresponding to and engaging the toothed outer end of a corresponding positioning rod.

The two sets of holding legs are mounted on the driving sliders. Each holding leg has a proximal end, a distal end and a hook. The proximal end of the holding leg is connected to a corresponding driving slider. The hook of the holding leg is mounted on the distal end of the holding leg.

The lock is securely mounted on the main seat and has a lock body, a connecting rod and a cable. The connecting rod protrudes from an inner end of the lock body, is detached from the lock body when the lock body is locked, is attached to the lock body when the lock body is unlocked, and is mounted through the threaded hole of the pivot. The cable is attached to the lock body.

The holding legs hold the tablet device. When the lock is locked, the lock is unable to detach from the main seat, and the positioning rods, the driving sliders and the holding legs are unable to move. Consequently, the securing device is unable to detach from the tablet device. Thus, as a cable of the lock is looped around a post, the tablet device is secured at a specific position and is not stolen easily.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
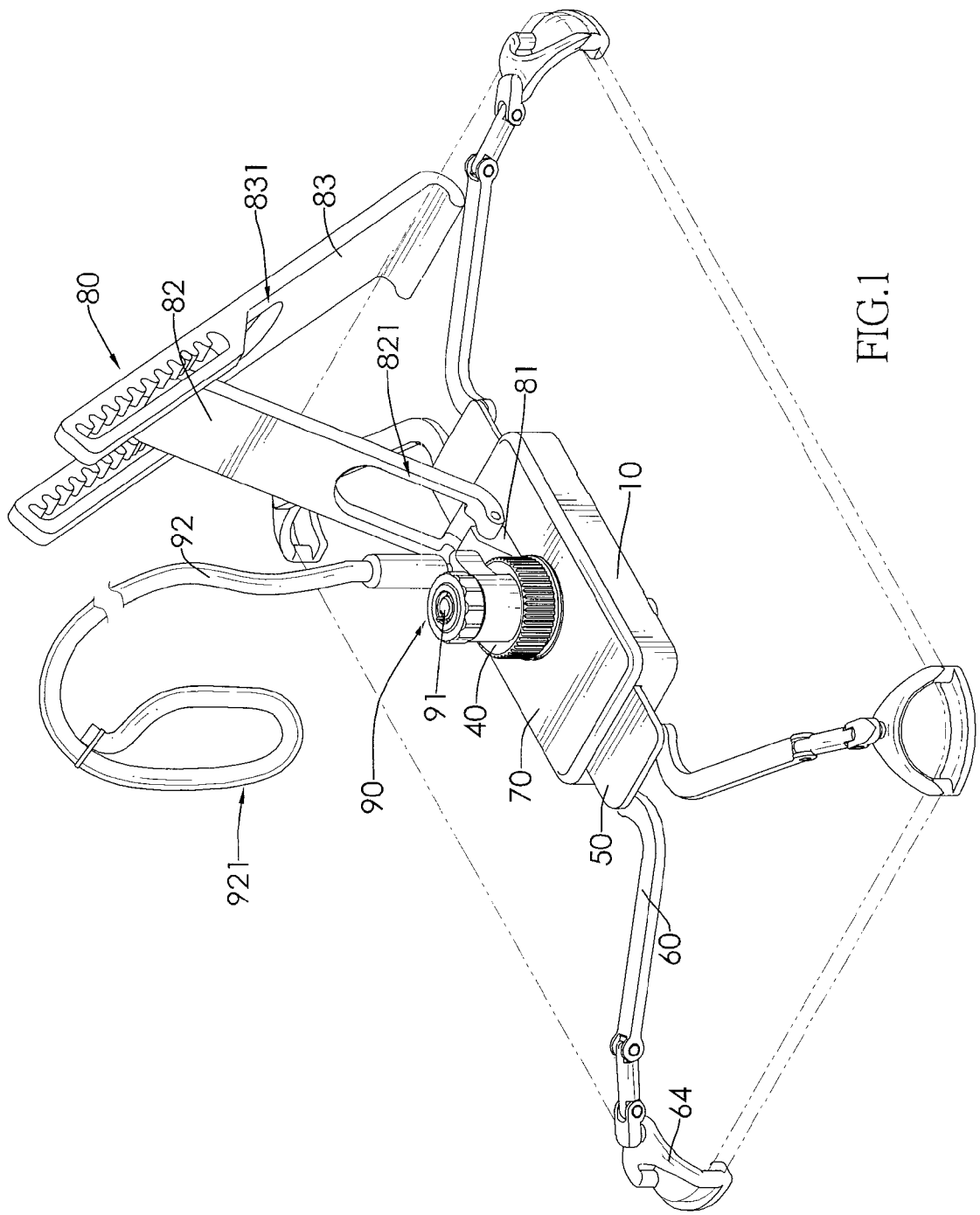
FIG. 1 is an operational perspective view of a securing device for a tablet device in accordance with the present invention.
Figure 2:
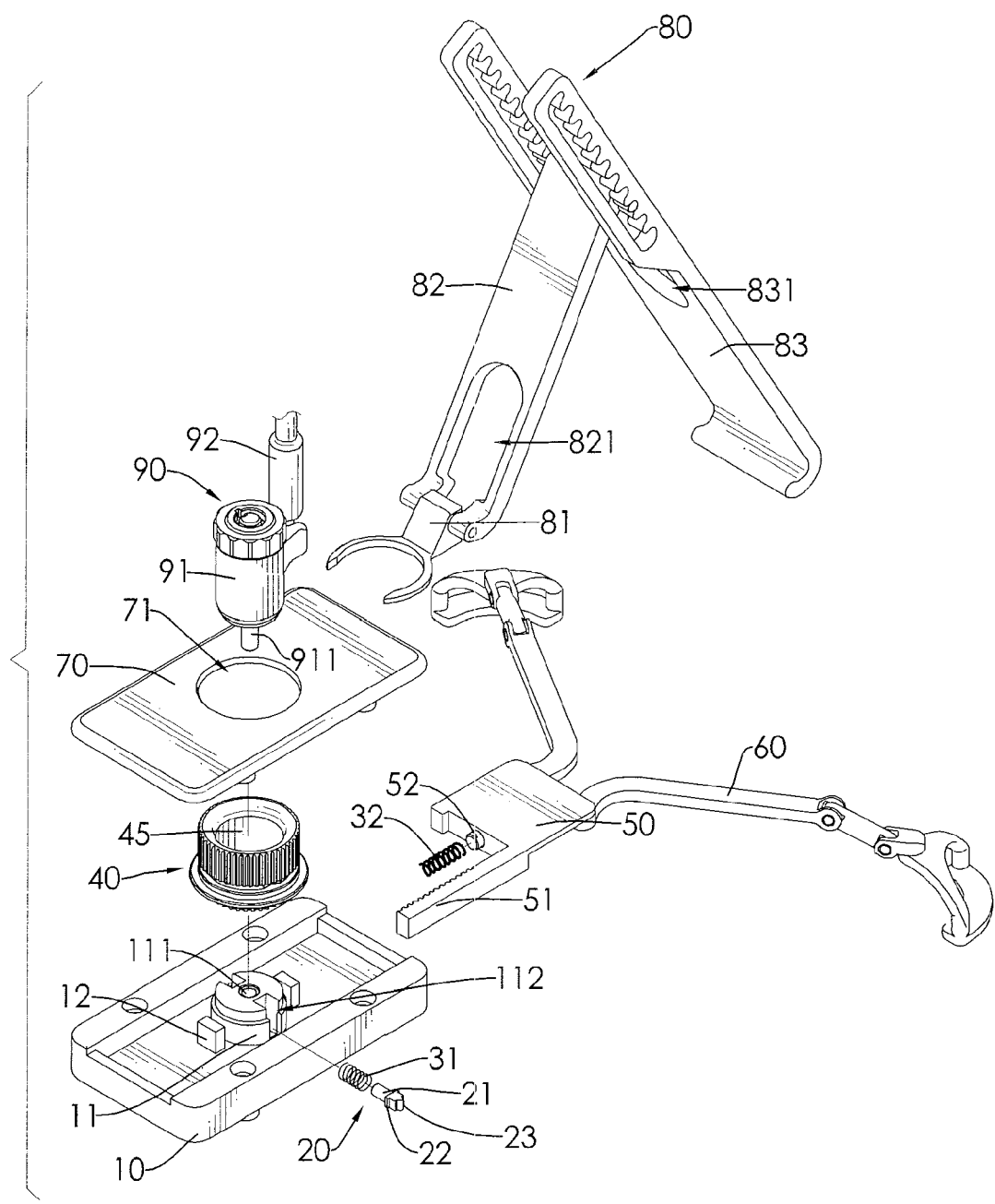
FIG. 2 is an enlarged exploded perspective view of the securing device in FIG. 1.

With reference to FIGS. 1 and 2, a securing device for a tablet device in accordance with the present invention comprises a main seat, two positioning rods 20, two first resilient elements 31, a rotating member 40, two driving sliders 50, two second resilient elements 32, two sets of holding legs 60, a supporting bracket 80 and a lock 90.

The main seat has a base 10, a pivot 11 and a cover 70.

With reference to FIGS. 2 to 5, the base 10 is rectangular and has a left side, a right side, a mounting surface, a main recess, a bottom, an inner front sidewall, an inner rear sidewall and two spring stoppers 12. The main recess is formed in the mounting surface of the base 10 and through the left and right sides of the base 10 and has a width. The bottom of the base 10 is defined in the main recess. The inner front sidewall and the inner rear sidewall of the base 10 are oppositely defined in the main recess. The width of the main recess is defined between the inner front sidewall and the inner rear sidewall of the base 10. The spring stoppers 12 are separately formed on the bottom of the base 10 and are arranged in a line parallel to the inner front sidewall of the base 10.

The pivot 11 is cylindrical, is formed on the bottom of the base 10, is disposed between the spring stoppers 12, and has a distal end, a sidewall, a threaded hole 111, two mounting recesses 112 and a mounting channel 113. The threaded hole 111 is axially formed in the distal end of the pivot 11. The mounting recesses 112 are separately formed in the sidewall of the pivot 11 and respectively correspond to the inner front sidewall and the inner rear sidewall of the base 10. The mounting channel 113 of the pivot 11 is radially formed through the pivot 11, communicates with the threaded hole 111 and has two open ends. The open ends of the mounting channel 113 of the pivot 11 are respectively formed through the sidewall of the pivot 11, and respectively correspond to and communicate with the mounting recesses 112 of the pivot 11.

The cover 70 is securely mounted on the mounting surface of the base 10 and has a through hole 71 and an inner peripheral edge. The through hole 71 of the cover 70 is formed through the cover 70 and corresponds to the pivot 11. The inner peripheral edge of the cover 70 is defined around the through hole 71 of the cover 70. Preferably, four screws are mounted through the base 10 and are fastened to the cover 70 so the cover 70 is securely held on the base 10.

The positioning rods 20 are respectively mounted through the open ends of the mounting channel 113 of the pivot 11 and respectively protrude in the mounting recesses 112 of the pivot 11. Each positioning rod 20 has an inner end 21, a guide surface 211, an outer end 23 and a flange 22. The inner end 21 of the positioning rod 20 protrudes into the mounting channel 113 of the pivot 11. The guide surface 211 of the positioning rod 20 is inclined, is formed on the inner end 21 of the positioning rod 20 and corresponds to the threaded hole 111 of the pivot 11. The outer end 23 of the positioning rod 20 is toothed. The flange 22 of the positioning rod 20 is formed between the inner end 21 and the outer end 23 of the positioning rod 20.

The first resilient elements 31 are compression springs, are respectively mounted between the pivot 11 and one of the positioning rods 20 and between the pivot 11 and the other one of the positioning rods 20, are respectively mounted around the inner ends 21 of the positioning rods 20, and push the positioning rods 20 outwards. Each one of the first resilient elements 31 has two ends respectively abutting the flange 22 of a corresponding positioning rod 20 and the pivot 11.

The rotating member 40 is mounted through the through hole 71 of the cover 70, is rotatably mounted around the pivot 11 and above the positioning rods 20, and has an inner end, an outer end, an outer sidewall, a driving portion 41, a holding portion 44, a flange 42, a peripheral groove 43 and a mounting channel 45. The driving portion 41 is disposed adjacent to the inner end of the rotating member 40 and has multiple teeth formed around the outer sidewall of the rotating member 40. The holding portion 44 is formed around the outer sidewall of the rotating member 40, is disposed adjacent to the outer end of the rotating member 40 and has a rough texture so a user is able to hold the holding portion 44 stably and then turn the rotating member 40. The flange 42 of the rotating member 40 is formed around the outer sidewall of the rotating member 40, and is disposed between the driving portion 41 and the holding portion 44 and under the inner peripheral edge of the cover 70. The peripheral groove 43 is formed in and around the outer sidewall of the rotating member 40 and is disposed between the holding portion 44 and the flange 42 of the rotating member 40. The mounting channel 45 of the rotating member 40 is axially formed through the rotating member 40.

The driving sliders 50 are mounted on the main seat, are mounted in the main recess of the base 10, are respectively disposed at the left and right sides of the base 10 and are transversely slidable. Each one of the driving sliders 50 has a width, an inner end, a rack 51 and a spring mount 52. The width of the driving slider 50 corresponds to the width of the main recess of the base 10 so the driving sliders 50 is able to slide stably in the main recess of the base 10. The rack 51 is elongated, transversely protrudes from the inner end of the driving slider 50 and has a toothed driving surface. The toothed driving surface of the rack 51 corresponds to and engages the toothed outer end 23 of a corresponding positioning rod 20 and the toothed driving portion 41 of the rotating member 40. The spring mount 52 is formed on the inner end of the driving slider 50 and corresponds to one of the spring stoppers 12.

The second resilient elements 32 are respectively mounted around the spring mounts 52 of the driving sliders 50. Each one of the second resilient elements 32 has two ends respectively abutting a corresponding spring stopper 12 and the inner end of a corresponding driving slider 50.

Figure 7:
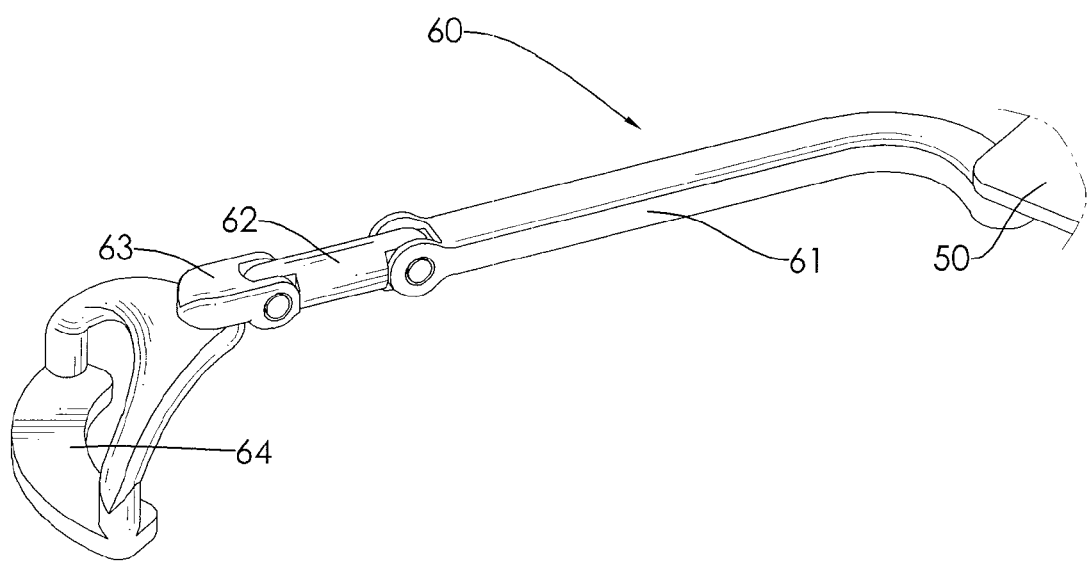
FIG. 7 is a perspective view of a connecting leg of the securing device in FIG. 1.

With reference to FIGS. 1 and 7, the two sets of holding legs 60 are respectively mounted on the driving sliders 50. Each one of the holding legs 60 has a proximal end, a distal end and a hook 64. The proximal end of the holding leg 60 is pivotally connected to a corresponding driving slider 50. The hook 64 is mounted on the distal end of the holding leg 60.

Preferably, each set of the holding legs 60 has two holding legs 60. Otherwise, each set of the holding legs 60 may have one holding leg 60.

Preferably, each one of the holding legs 60 has a first bar 61, a second bar 62 and a third bar 63. The first bar 61 is pivotally connected to the outer end of the corresponding driving slider 50 and pivots parallel to the driving slider 50. The second bar 62 is pivotally connected to the first bar 61 and pivots perpendicular to the driving slider 50. The third bar 63 is pivotally connected to the second bar 62 and pivots perpendicular to the driving slider 50. The hook 64 is pivotally connected to the third bar 63 and pivots parallel to the driving slider 50.

The supporting bracket 80 is securely attached to the rotating member 40 and has a holder 81, a connector 82 and a stand 83. The holder 81 is securely mounted in and around the peripheral groove 43 of the rotating member 40. The connector 82 is pivotally connected to the holder 81, pivots perpendicular to the driving slider 50 and has a through hole 821 formed through the connector 82. The stand 83 is pivotally connected to the connector 82, pivots perpendicular to the driving slider 50 and has a distal end, a through hole 831 and a pivot portion. The distal end of the stand 83 is a hook. The through hole 831 of the stand 83 is formed through the stand 83 and receives the connector 82. The pivot portion of the stand 83 to which the connector 82 is connected is adjustable.

The lock 90 is securely mounted on the base 10 of the main seat and has a lock body 91, a connecting rod 911 and a cable 92. The lock body 91 is axially mounted in the mounting channel 45 of the rotating member 40. The connecting rod 911 protrudes from an inner end of the lock body 91, is detached from the lock body 91 when the lock body 91 is locked, is attached to the lock body 91 when the lock body 91 is unlocked, is mounted through the threaded hole 111 of the pivot 11 and has an outer thread and a distal end. The outer thread of the connecting rod 911 is formed on an outer surface of the connecting rod 911 and is screwed to the pivot 11. The distal end of the connecting rod 911 is beveled. The cable 92 is attached to the lock body 91 and has a distal end and a lasso 921 formed on the distal end of the cable 92.

Figure 4:
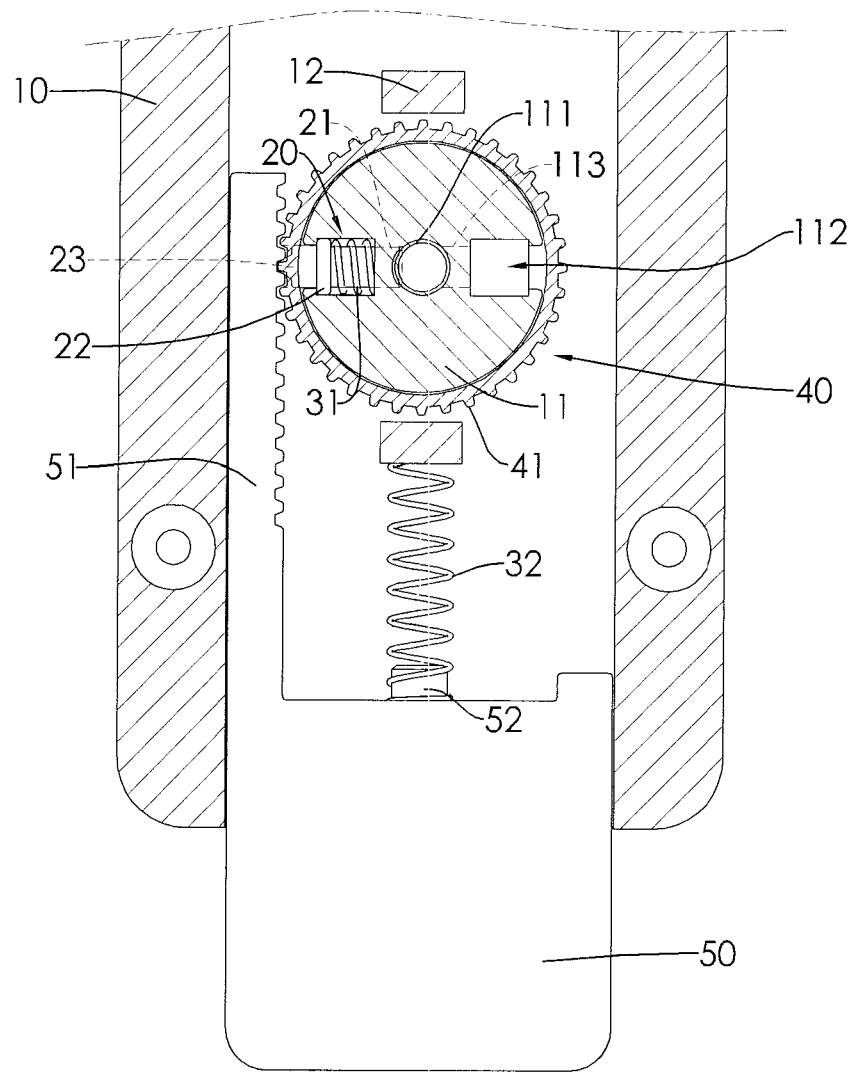
FIG. 4 is an enlarged top view in partial section of the securing device in FIG. 1.
Figure 5:
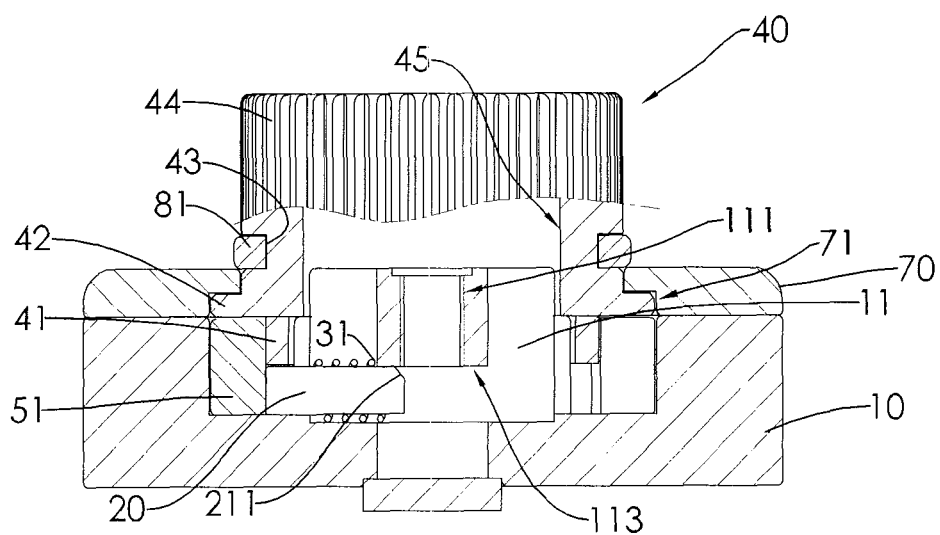
FIG. 5 is an enlarged side view in partial section of the securing device in FIG. 1.

With reference to FIGS. 1, 4 and 5, when assembling the securing device to the table device, the lock 90 is detached from the rotating member 40 and the main seat, and the holding legs 60 hold the tablet device. Thus, the positioning rods 20 are able to slide freely along the mounting channel 113 of the pivot 11. Moreover, as the rotating member 40 is rotated, the toothed driving portion 41 of the rotating member 40 drive the racks 51 of the driving sliders 50 and the driving sliders 50 to slide into the main seat, and pushes the positioning rods 20 to slide along the mounting channel 113 of the pivot 11. Thus, the securing device is adjusted to fit the tablet device and the holding legs 60 hold the tablet device securely.

Figure 6:
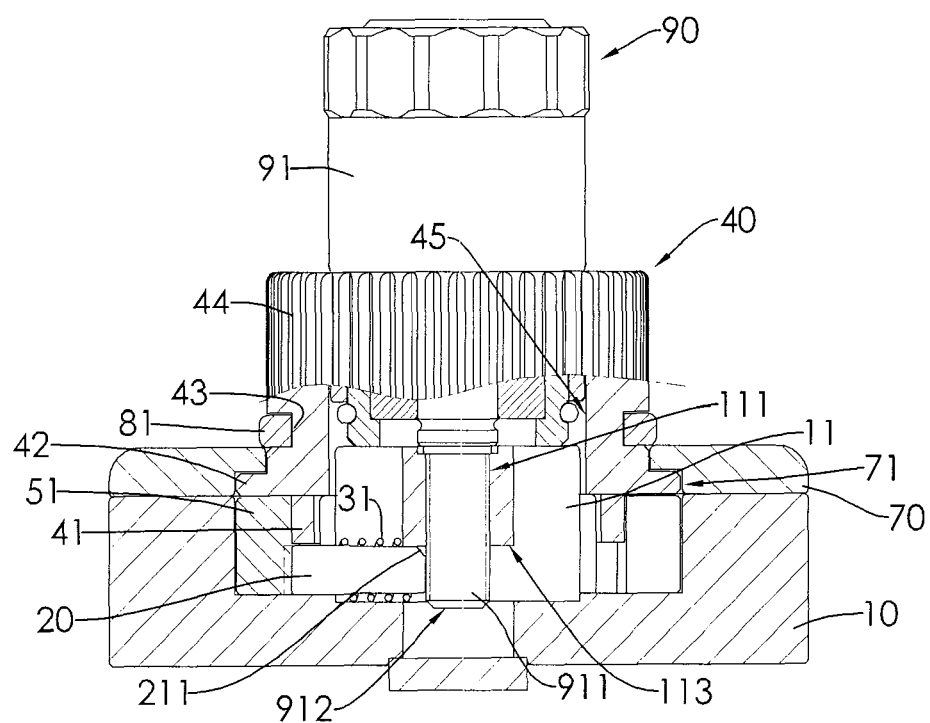
FIG. 6 is an enlarged side view in partial section of the securing device in FIG. 1, showing a lock inserted therein.
Figure 8:
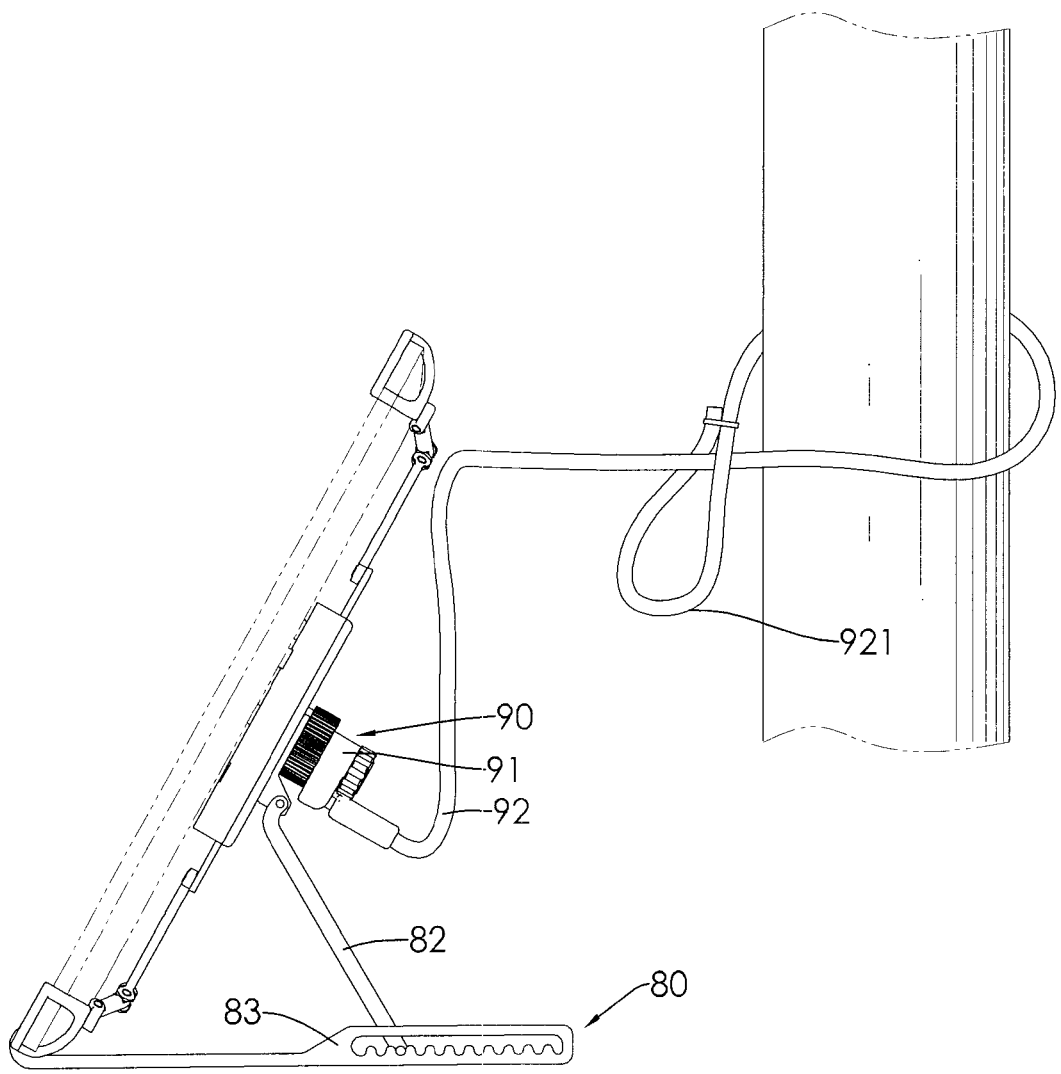
FIG. 8 is an operational side view of the securing device in FIG. 1.

With reference to FIGS. 1, 6 and 8, when locking the securing device, the cable 92 is looped around a post, and the lock body 91 is mounted through the lasso 921 and then is mounted in the mounting channel 45 of the rotating member 40. The connecting rod 911 is mounted through the threaded hole 111 of the pivot 11, is screwed to the pivot 11 and protrudes to the mounting channel 113 of the pivot 11. Thus, the connecting rod 911 is disposed between the inner ends 21 of the positioning rods 20 so the positioning rods 20 are unable to slide along the mounting channel 113 of the pivot 11. Consequently, the rotating member 40 is unable to be rotated to drive the driving sliders 50 that engage the positioning rods 20 to slide. Therefore, the securing device is unable to detach from the tablet device. Furthermore, since the lock 90 is unable to detach from the pivot 11 of main seat when the lock body 91 is locked, the securing device is also unable to detach from the tablet device. Therefore, the table device is secured at a specific position and is not stolen easily.

With reference to FIGS. 5 and 6, when the connecting rod 911 of the lock 90 protrudes to the mounting channel 113 of the pivot 11, the beveled distal end of the connecting rod 911 moves along the guide surfaces 211 of the positioning rods 20 to ensure that the positioning rods 20 are pushed whenever the connecting rod 911 protrudes to the mounting channel 113 of the pivot 11.

Figure 3:
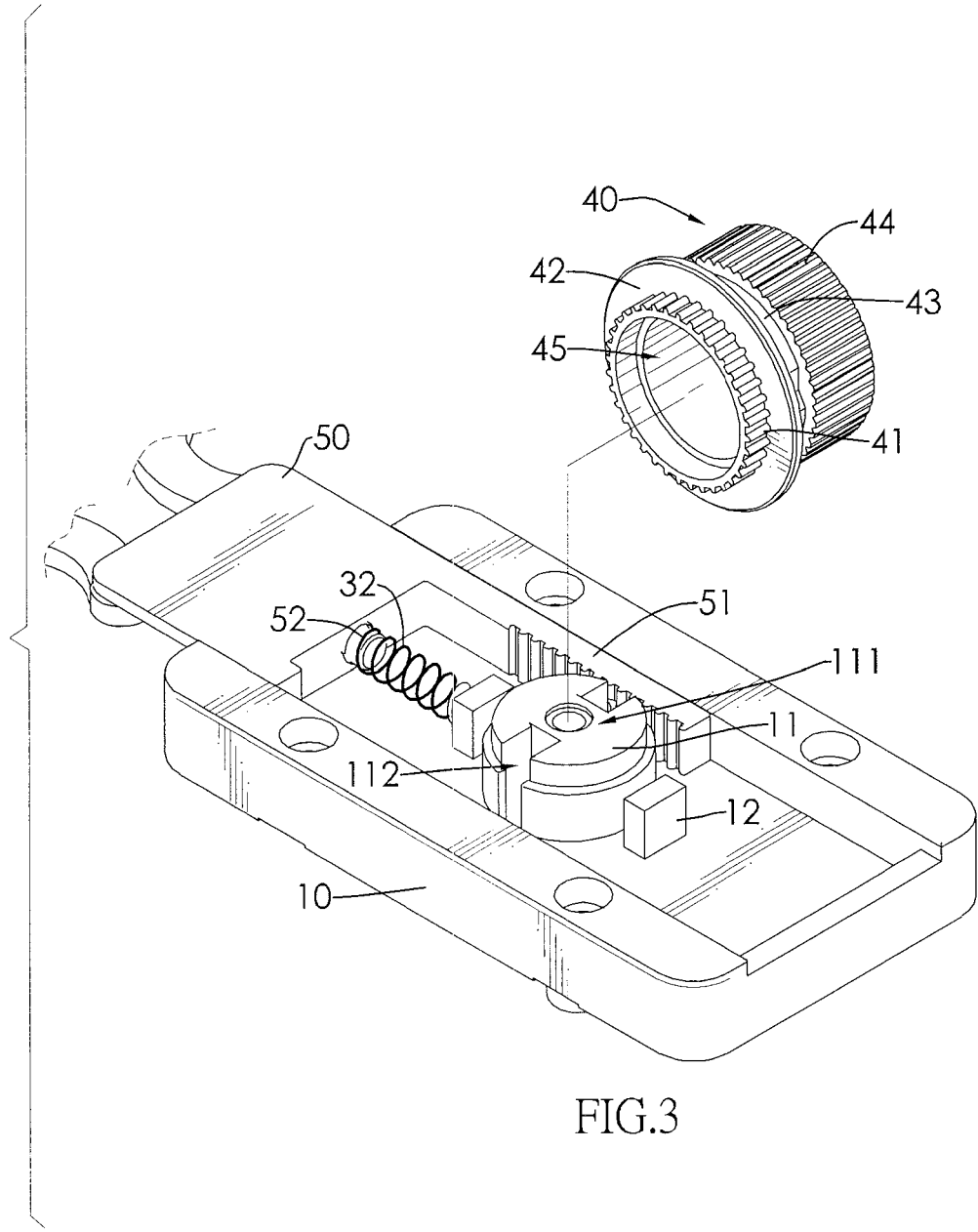
FIG. 3 is another enlarged exploded perspective view of the securing device in FIG. 1.

With reference to FIGS. 3 and 4, with the second resilient elements 32 that push the driving sliders 50 outwards, the rotating member 40 is able to be rotated in an effort-saving way.

With reference to FIG. 7, the bars 61, 62, 63 of each holding leg 60 that are pivotally connected one by one allow the holding legs 60 to fit and hold the tablet devices of different shapes and sizes.

With reference to FIG. 8, when the stand 83 of the supporting bracket 80 is placed on a plane, the distal end of the stand 83 hooks the tablet device and the tablet device tilts, the supporting bracket 80 becomes "a bookstand" so a user is able to use the tablet device with a comfortable pose. Moreover, by adjusting the pivot portion of the stand 83 to which the connector 82 is connected, tilting angles of the tablet device are also adjusted.

Figure 9:
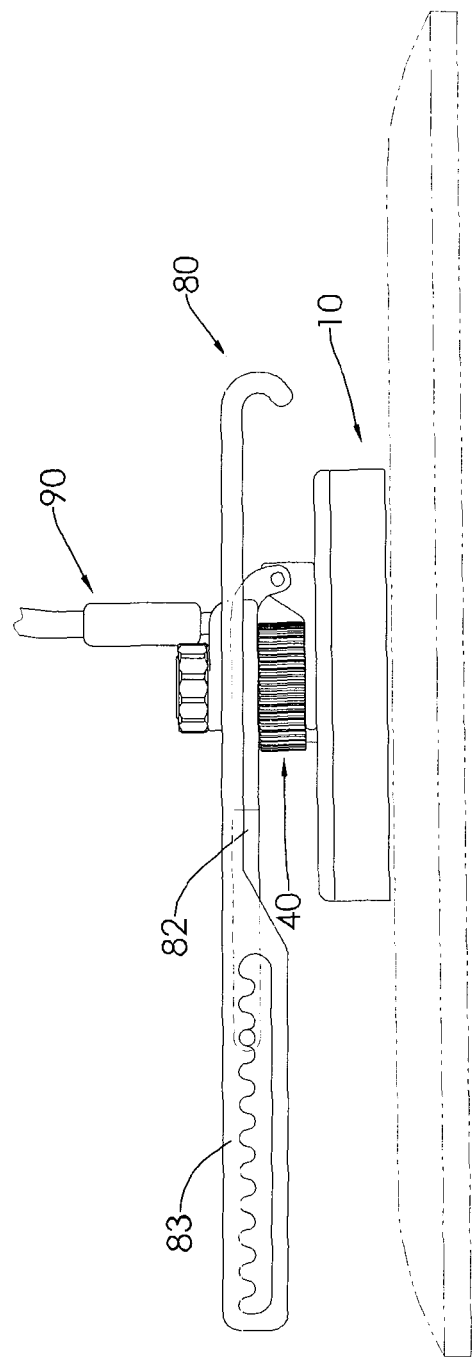
FIG. 9 is another operational side view of the securing device in FIG. 1, shown folded.

With further reference to FIG. 9, when the user does not want to use the supporting bracket 80, the distal end of the stand 83 is detached from the tablet device, and the stand 83 and the connector 82 of the supporting bracket 80 pivot relatively until the stand 83 and the connector 82 overlap each other. Then, the through holes 821, 831 of the connector 82 and the stand 83 are mounted around the rotating member 40 so the supporting bracket 80 does not hinder the lock 90 when mounted into the rotating member 40.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A securing device for a tablet device comprising
a main seat having a pivot having
    a distal end;
    a sidewall;
    a threaded hole axially formed in the distal end of the pivot; and
    a mounting channel radially formed through the pivot, communicating with the threaded hole and having two open ends respectively formed through the sidewall of the pivot;
two positioning rods respectively mounted through the open ends of the mounting channel of the pivot, and each one of the positioning rods having
    an inner end protruding into the mounting channel of the pivot; and
    an outer end being toothed;
two first resilient elements respectively mounted between the pivot and one of the positioning rods and between the pivot and the other one of the positioning rods, and pushing the positioning rods outwards;
two driving sliders mounted on the main seat and being transversely slidable, and each one of the driving sliders having a rack transversely protruding from the driving slider and having a toothed driving surface corresponding to and engaging the toothed outer end of a corresponding positioning rod;
two sets of holding legs respectively mounted on the driving sliders, and each one of the holding legs having
    a proximal end connected to a corresponding driving slider;
    a distal end; and
    a hook mounted on the distal end of the holding leg; and
a lock securely mounted on the main seat and having
    a lock body;
    a connecting rod protruding from an inner end of the lock body, detached from the lock body when the lock body is locked, attached to the lock body when the lock body is unlocked, mounted through the threaded hole of the pivot and having
        an outer thread formed on an outer surface of the connecting rod and screwed to the pivot; and
        a distal end; and
    a cable attached to the lock body and having a distal end and a lasso formed on the distal end of the cable.

2. The securing device as claimed in claim 1, wherein
the securing device further comprises a rotating member rotatably mounted around the pivot and above the positioning rods, and having
    a driving portion disposed adjacent to an inner end of the rotating member and having multiple teeth formed around an outer sidewall of the rotating member; and
    a mounting channel axially formed through the rotating member;
the toothed driving surfaces of the racks further engage the toothed driving portion of the rotating member.

3. The securing device as claimed in claim 2, wherein
the main seat has
    a base having a mounting surface; and
    a cover securely mounted on the mounting surface of the base and having a through hole formed through the cover;
the pivot of the main seat is formed on the base, corresponds to the through hole of the base and has two mounting recesses separately formed in the sidewall of the pivot;
the open ends of the mounting channel of the pivot respectively correspond to and communicate with the mounting recesses of the pivot;
the rotating member is mounted through the through hole of the cover; and
the driving sliders are mounted on the mounting surface of the base.

4. The securing device as claimed in claim 3, wherein
the cover of the main seat has an inner peripheral edge defined around the through hole of the cover; and
the rotating member further has a holding portion formed around the outer sidewall of the rotating member, disposed adjacent to an outer end of the rotating member and having a rough texture; and a flange formed around the outer sidewall of the rotating member, and disposed between the driving portion and the holding portion and under the inner peripheral edge of the cover.

5. The securing device as claimed in claim 4, wherein the base of the main seat has a main recess formed in the mounting surface of the base and through a left side and a right side of the base, and having a width defined between an inner front sidewall and an inner rear sidewall that are oppositely defined in the main recess; and a bottom defined in the main recess;

the pivot of the main seat is formed on the bottom of the base;

the driving sliders are mounted in the main recess of the base and are respectively disposed at the left and right sides of the base, and each one of the driving sliders having a width corresponding to the width of the main recess of the base.

6. The securing device as claimed in claim 5, wherein the positioning rods respectively protrude in the mounting recesses of the pivot, and each one of the positioning rods further has a flange formed between the inner end and the outer end of the positioning rod.

7. The securing device as claimed in claim 6, wherein each set of the holding legs has two holding legs, and each one of the holding legs has a first bar pivotally connected to the corresponding driving slider and pivoting parallel to the driving slider;

a second bar pivotally connected to the first bar and pivoting perpendicular to the driving slider; and a third bar pivotally connected to the second bar and pivoting perpendicular to the driving slider;

the hook of each one of the holding legs is pivotally connected to the third bar and pivots parallel to the driving slider.

8. The securing device as claimed in claim 7, wherein the rotating member further has a peripheral groove formed in and around the outer sidewall of the rotating member and disposed between the holding portion and the flange of the rotating member; and the securing device further comprises a supporting bracket securely attached to the rotating member and having a holder securely mounted in and around the peripheral groove of the rotating member;

a connector pivotally connected to the holder, pivoting perpendicular to the driving slider and having a through hole formed through the connector; and a stand pivotally connected to the connector, pivoting perpendicular to the driving slider and having a distal end being a hook;

a through hole formed through the stand and receiving the connector; and a pivot portion to which the connector is connected being adjustable.

9. The securing device as claimed in claim 8, wherein the base of the main seat further has two spring stoppers separately formed on the bottom of the base and arranged in a line parallel to the inner front sidewall of the base;

the pivot of the main seat is disposed between the spring stoppers;

each one of the driving sliders further has a spring mount formed on an inner end of the driving slider and corresponding to one of the spring stoppers; and the securing device further comprises two second resilient elements respectively mounted around the spring mounts of the driving sliders, each one of the second resilient elements having two ends respectively abutting a corresponding spring stopper and the inner end of a corresponding driving slider.

10. The securing device as claimed in claim 9, wherein each one of the positioning rods further has a guide surface being inclined, formed on the inner end of the positioning rod and corresponding to the threaded hole of the pivot; and the distal end of the connecting rod of the lock is beveled.

11. The securing device as claimed in claim 10, wherein the first resilient elements are compression springs.

* * * * *